US012427892B1

(12) United States Patent  
Broughton et al.

(10) Patent No.: US 12,427,892 B1  
(45) Date of Patent: Sep. 30, 2025

(54) WATERCRAFT WITH A COOLING SYSTEM

(71) Applicant: BRP MARINE US INC., Clinton, MI (US)

(72) Inventors: George Broughton, Wadsworth, IL (US); James Macier, Beach Park, IL (US); Anthony Lavigna, Beach Park, IL (US)

(73) Assignee: BRP Marine US Inc., Clinton, MI (US)

( * ) Notice: Subject to any disclaimer, the term of this patent is extended or adjusted under 35 U.S.C. 154(b) by 716 days.

(21) Appl. No.: 17/827,926

(22) Filed: May 30, 2022

Related U.S. Application Data

(60) Provisional application No. 63/195,117, filed on May 31, 2021.

(51) Int. Cl.

| | |
|---|---|
| *B60L 58/26* | (2019.01) |
| *B63B 1/12* | (2006.01) |
| *B63B 35/38* | (2006.01) |
| *B63H 21/17* | (2006.01) |
| *F28D 1/02* | (2006.01) |
| *H01M 10/613* | (2014.01) |
| *H01M 10/625* | (2014.01) |
| *H01M 10/6556* | (2014.01) |
| *H01M 10/6568* | (2014.01) |

(52) U.S. Cl.  
CPC ............. *B60L 58/26* (2019.02); *B63B 1/121* (2013.01); *B63B 35/38* (2013.01); *B63H 21/17* (2013.01); *F28D 1/022* (2013.01); *H01M 10/613* (2015.04); *H01M 10/625* (2015.04); *H01M 10/6556* (2015.04); *H01M 10/6568* (2015.04); *B60L 2200/10* (2013.01); *H01M 2220/20* (2013.01)

(58) Field of Classification Search  
CPC ...... B60L 58/00; B60L 58/26; B60L 2200/10; H01M 10/00; H01M 10/625; H01M 10/6556; H01M 10/6558; H01M 10/613; B63B 1/00; B63B 1/121; B63B 35/00; B63B 35/38; B63H 21/00; B63H 21/17; B63H 20/00; B63H 20/28; B63H 20/285; B63H 20/14; B63H 21/20; F28D 1/022  
USPC .......................................................... 440/6  
See application file for complete search history.

(56) References Cited

U.S. PATENT DOCUMENTS

| | | |
|---|---|---|
| 2,382,218 A | 8/1945 | Fernstrum |
| 2,577,194 A | 12/1951 | Jannsen |
| 2,682,852 A | 7/1954 | Ruffolo |
| 3,753,159 A | 8/1973 | Burwen et al. |

(Continued)

*Primary Examiner* — Lars A Olson  
(74) *Attorney, Agent, or Firm* — BCF LLP

(57) ABSTRACT

A watercraft including a hull; a deck; a battery and an electric motor; a cooling system including: a heat exchanger; a closed cooling path in thermal contact with the heat exchanger and the battery; and an open cooling path in thermal contact with a portion of the closed cooling path. Also a cooling system including: a heat exchanger including: a heat exchanger body, a first channel defined in the heat exchanger body, the first channel being in thermal contact with the outer surface for conducting heat therebetween, and a second channel defined in the heat exchanger body, the second channel being in thermal contact with the first channel, a first cooling path in thermal contact with the battery, a portion of the first cooling path being defined by the first channel; and a second cooling path defined by the second channel.

20 Claims, 13 Drawing Sheets

(56) References Cited

U.S. PATENT DOCUMENTS

| | | | |
|---|---|---|---|
| 4,360,350 A | 11/1982 | Grover | |
| 6,544,085 B1 | 4/2003 | Menard et al. | |
| 7,452,251 B2 | 11/2008 | Boebel | |
| 7,614,925 B2 | 11/2009 | Boebel et al. | |
| 8,298,023 B2 * | 10/2012 | Daikoku | B63H 20/02 440/6 |
| 8,337,264 B2 | 12/2012 | Boebel | |
| 9,446,830 B2 * | 9/2016 | Hartmeyer | B63H 21/17 |
| 10,124,870 B2 | 11/2018 | Bergmann et al. | |
| 10,464,651 B2 | 11/2019 | Rebele et al. | |
| 10,647,398 B2 | 5/2020 | Biebach | |
| 10,654,551 B1 | 5/2020 | Doremus et al. | |
| 2020/0140049 A1 | 5/2020 | Gil et al. | |
| 2020/0255110 A1 | 8/2020 | Doremus et al. | |
| 2020/0255112 A1 | 8/2020 | Doremus et al. | |

\* cited by examiner

WATERCRAFT WITH A COOLING SYSTEM

CROSS-REFERENCE

The present application claims priority to U.S. Provisional Patent Application No. 63/195,117, entitled "Watercraft with a Cooling System," filed on May 31, 2021, the entirety of which is incorporated herein by reference.

FIELD OF TECHNOLOGY

The present technology relates to watercraft, and more specifically to watercraft having a battery and a cooling system.

BACKGROUND

In watercraft with electric propulsion systems, cooling to electronic components is sometimes provided by a closed loop cooling system that includes a heat exchanger arranged to contact water when in use. Coolant in the closed loop transfers heat from the electronic components to the heat exchanger, which in turn transfers heat to the water running along the hull of such a watercraft.

While such hull-mounted heat-exchangers can be an effective means of cooling the electric propulsion system when the watercraft is in operation and operating on a body of water, the solution is not as effective when the watercraft is removed from water. For example, it may be desired or necessary to charge a battery when the watercraft is out of the water, such as when the vessel is on a trailer or a lift. In such a case, the hull-mounted heat exchanger would be less efficient compared to operation on water, but heat produced when the battery is charging may still require cooling.

Thus, there is a desire for a recreational watercraft with a system for cooling an electric propulsion system.

SUMMARY

It is an object of the present technology to ameliorate at least some of the inconveniences present in the prior art.

According to one aspect of the present technology, there is provided a watercraft with an electric propulsion system and a cooling system for managing heat for the electronic components, especially the battery. The cooling system is arranged such that when the watercraft is in use in a body of water: coolant flowing through one cooling path absorbs heat from the battery, a heat exchanger absorbs heat from coolant flowing through the cooling path, and the heat exchanger is cooled by transferring heat to the body of water via the outer surface of the heat exchanger. When the battery is connected to a power source for charging and the watercraft is not in water, coolant flowing through the cooling path absorbs heat from the battery, the heat exchanger absorbs heat from coolant flowing through the cooling path, and coolant flowing through the another cooling path absorbs heat from the heat exchanger or the cooling path cooling the battery. As electric watercraft are often charged out of the water, for instance when stored in a trailer or in dry dock in a marina, portions of the propulsion system (especially the battery) can produce heat even when not "in use". Cooling by way of water-contacting heat exchangers is thus not fully efficient for all cooling needs for such a watercraft. At least some heat will be transferred to surrounding air, but in a manner less efficient than when in water. It is also noted that some types of batteries, including some used for electric vehicle propulsion, have low maximum temperatures relative to other electric components and may require close temperature management. By providing a secondary cooling path for cooling the heat exchanger when the watercraft is not in use on water, heat produced by the battery while charging can be more efficiently managed while permitting the battery to be charged when more convenient.

According to an aspect of the present technology, there is provided a watercraft including a hull; a deck disposed above the hull; an electric propulsion system supported by at least one of the hull and the deck, the electric propulsion system including a battery, and an electric motor electrically connected the battery; a cooling system including: a heat exchanger disposed in the hull, the heat exchanger including an outer surface arranged to conduct heat out of the hull; a closed cooling path disposed at least partially between the hull and the deck, the closed cooling path being in thermal contact with the heat exchanger, the closed cooling path being in thermal contact with the battery; and an open cooling path disposed at least partially between the hull and the deck, the open cooling path being in thermal contact with a portion of the closed cooling path.

In some embodiments, the cooling system is arranged such that, when the battery, the closed cooling path, and the open cooling path are in use: coolant flowing through the closed cooling path absorbs heat from the battery; the heat exchanger absorbs heat from coolant flowing through the closed cooling path; and coolant flowing through the open cooling path absorbs heat from the closed cooling path.

In some embodiments, a portion of the closed cooling path is defined by the heat exchanger.

In some embodiments, a portion of the open cooling path is defined by the heat exchanger, the closed cooling path and the open cooling path being in thermal contact via the heat exchanger.

In some embodiments, the heat exchanger includes a heat exchanger body formed from heat conductive material, the heat exchanger body including the outer surface; and a closed path channel defined by the heat exchanger body, the closed path channel forming the portion of the closed cooling path.

In some embodiments, the heat exchanger further comprises an open path channel defined by the heat exchanger body, the open path channel forming part of the open cooling path.

In some embodiments, the open path channel is defined in an inner portion of the heat exchanger; the open path channel extends through the heat exchanger body generally parallel to the outer surface; the closed path channel is defined between the open path channel and the outer surface; and the closed path channel extends through the heat exchanger body generally parallel to the open path channel and the outer surface.

In some embodiments, the heat exchanger is arranged as a countercurrent flow heat exchanger; and when the closed cooling path and the open cooling path are in use, coolant flowing through the closed path channel flows antiparallel to coolant flowing through open path channel.

In some embodiments, the heat exchanger is arranged as a cocurrent flow heat exchanger; and when the closed cooling path and the open cooling path are in use, coolant flowing through the closed path channel flows parallel to coolant flowing through open path channel.

In some embodiments, the cooling system is arranged such that, when the battery, the closed cooling path, and the open cooling path are in use: coolant flowing through the closed cooling path absorbs heat from the battery; the heat exchanger absorbs heat from coolant flowing through the closed path channel; and coolant flowing through the open path channel absorbs heat from the heat exchanger.

In some embodiments, the heat exchanger further includes an open path channel inlet connected to the heat exchanger body, the open path channel inlet being fluidly connected to the open path channel, the open path channel inlet being configured for selectively connecting to a conduit for providing coolant to the open cooling path; and an open path channel outlet connected to the heat exchanger body, the open path channel outlet being fluidly connected to the open path channel.

In some embodiments, the heat exchanger further includes a closed path channel inlet connected to the heat exchanger body, the closed path channel inlet being fluidly connected to the closed path channel; and a closed path channel outlet connected to the heat exchanger body, the closed path channel outlet being fluidly connected to the closed path channel.

In some embodiments, the cooling system further includes a pump fluidly connected to the closed cooling path for pumping coolant through the closed cooling path.

In some embodiments, the heat exchanger is a first heat exchanger; and further including at least one electrical component operatively connected to the battery, a second heat exchanger disposed in the hull, and a component cooling path in thermal contact with the at least one electrical component and the second heat exchanger.

In some embodiments, the closed cooling path is a first closed cooling path; the electric propulsion system further includes a propulsion shaft operatively connected to the electric motor, and a propeller connected to a rear end portion of the propulsion shaft; and the cooling system further includes a second closed cooling path in thermal contact with the electric motor.

In some embodiments, the hull defines an aperture; the heat exchanger is disposed in the aperture; and the outer surface of the heat exchanger forms a portion of an outer surface of the watercraft, the outer surface of the heat exchanger being arranged to contact water when the watercraft is in use.

In some embodiments, the hull defines a channel extending along a longitudinal center plane of the watercraft; the heat exchanger is a first heat exchanger disposed in the hull to one side of the channel; and the cooling system includes a second heat exchanger disposed in the hull on a side of the channel opposite to the first heat exchanger.

In some embodiments, the watercraft further includes a pair of pontoon tubes connected to at least one of the hull and the deck.

In some embodiments, the cooling system is arranged such that: when the watercraft is in use in a body of water: coolant flowing through the closed cooling path absorbs heat from the battery, the heat exchanger absorbs heat from coolant flowing through the closed cooling path, and the heat exchanger is cooled by transferring heat to the body of water via the outer surface of the heat exchanger; and when the battery is connected to a power source for charging and the watercraft is not in the body of water: the open cooling path is connected to an exterior coolant source, coolant flowing through the closed cooling path absorbs heat from the battery, and coolant flowing through the open cooling path absorbs heat from coolant flowing through the closed cooling path.

In some embodiments, a longitudinal length of the hull is at least 4 meters.

In some embodiments, the longitudinal length of the hull is less than 10 meters.

According to another aspect of the present technology, there is provided a watercraft including a hull; a deck disposed above the hull; an electric propulsion system supported by at least one of the hull and the deck, the electric propulsion system including a battery, and an electric motor electrically connected the battery; a cooling system including: a heat exchanger disposed in the hull, the heat exchanger including: a heat exchanger body including an outer surface arranged to contact water when the watercraft is in use, a first channel defined in the heat exchanger body, the first channel being in thermal contact with the outer surface for conducting heat therebetween, and a second channel defined in the heat exchanger body, the second channel being in thermal contact with the first channel for conducting heat therebetween, a first cooling path disposed at least partially between the hull and the deck, the first cooling path being in thermal contact with the battery, a portion of the first cooling path being defined by the first channel; and a second cooling path disposed at least partially between the hull and the deck, a portion of the second cooling path being defined by the second channel.

In some embodiments, the cooling system is arranged such that, when the battery, the first cooling path, and the second cooling path are in use: coolant flowing through the first cooling path absorbs heat from the battery; the heat exchanger absorbs heat from coolant flowing through the first cooling path; and coolant flowing through the second cooling path absorbs heat from the heat exchanger.

In some embodiments, the heat exchanger body is formed from heat conductive material.

In some embodiments, the second channel is defined in an inner portion of the heat exchanger; the second channel extends through the heat exchanger body generally parallel to the outer surface; the first channel is defined between the second channel and the outer surface; and the first channel extends through the heat exchanger body generally parallel to the second channel and the outer surface.

In some embodiments, the heat exchanger is arranged as a countercurrent flow heat exchanger; and when the first path and the second path are in use, coolant flowing through the second channel flows antiparallel to coolant flowing through first channel.

In some embodiments, the heat exchanger is arranged as a cocurrent flow heat exchanger; and when the first path and the second path are in use, coolant flowing through the first channel flows parallel to coolant flowing through second channel.

In some embodiments, the first cooling path is a closed cooling path; and the second cooling path is an open cooling path.

In some embodiments, the heat exchanger further includes an open path channel inlet connected to the heat exchanger body, the open path channel inlet being fluidly connected to the second channel, the open path channel inlet being configured for selectively connecting to a conduit for providing coolant to the open cooling path; and an open path channel outlet connected to the heat exchanger body, the open path channel outlet being fluidly connected to the open path channel.

In some embodiments, the cooling system further includes a pump fluidly connected to the first cooling path for pumping coolant through the first cooling path.

In some embodiments, the heat exchanger is a first heat exchanger; and further including at least one electrical component operatively connected to the battery, a second heat exchanger disposed in the hull, and a component cooling path in thermal contact with the at least one electrical component and the second heat exchanger.

In some embodiments, the hull defines an aperture; the heat exchanger is disposed in the aperture; and the outer surface of the heat exchanger forms a portion of an outer surface of the watercraft, the outer surface of the heat exchanger being arranged to contact water when the watercraft is in use.

In some embodiments, the hull defines a channel extending along a longitudinal center plane of the watercraft; the heat exchanger is a first heat exchanger disposed in the hull to one side of the channel; and the cooling system includes a second heat exchanger disposed in the hull on a side of the channel opposite to the first heat exchanger.

In some embodiments, the watercraft further includes a pair of pontoon tubes connected to at least one of the hull and the deck.

In some embodiments, the cooling system is arranged such that: when the watercraft is in use in a body of water: coolant flowing through the first cooling path absorbs heat from the battery, the heat exchanger absorbs heat from coolant flowing through the first cooling path, and the heat exchanger is cooled by transferring heat to the body of water via the outer surface of the heat exchanger; and when the battery is connected to a power source for charging and the watercraft is not in the body of water: coolant flowing through the first cooling path absorbs heat from the battery, the heat exchanger absorbs heat from coolant flowing through the first cooling path, and coolant flowing through the second cooling path absorbs heat from the heat exchanger.

In some embodiments, the second cooling path is configured to be connected to an external coolant source when the battery is connected to a power source for charging.

According to yet another aspect of the present technology, there is provided a method for charging a battery of a watercraft. The method includes supplying an open cooling path of the watercraft with a first coolant from an external coolant source; causing the first coolant to flow through the open cooling path; supplying power to the battery of the watercraft from an external power source to recharge the battery; and pumping a second coolant through a closed cooling path using a pump fluidly connected to the closed cooling path, the closed cooling path being in thermal contact with the battery and the open cooling path, the closed cooling path absorbing heat from the battery, the open cooling path absorbing heat from the closed cooling path.

For purposes of this application, terms related to spatial orientation such as forwardly, rearwardly, longitudinally, upwardly, downwardly, laterally, left, and right, are as they would normally be understood by an operator in the watercraft and facing a bow of the watercraft. Terms related to spatial orientation when describing or referring to components or sub-assemblies of the watercraft, separately from the watercraft, should be understood as they would be understood when these components or sub-assemblies are mounted to the watercraft, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

Figure 1:
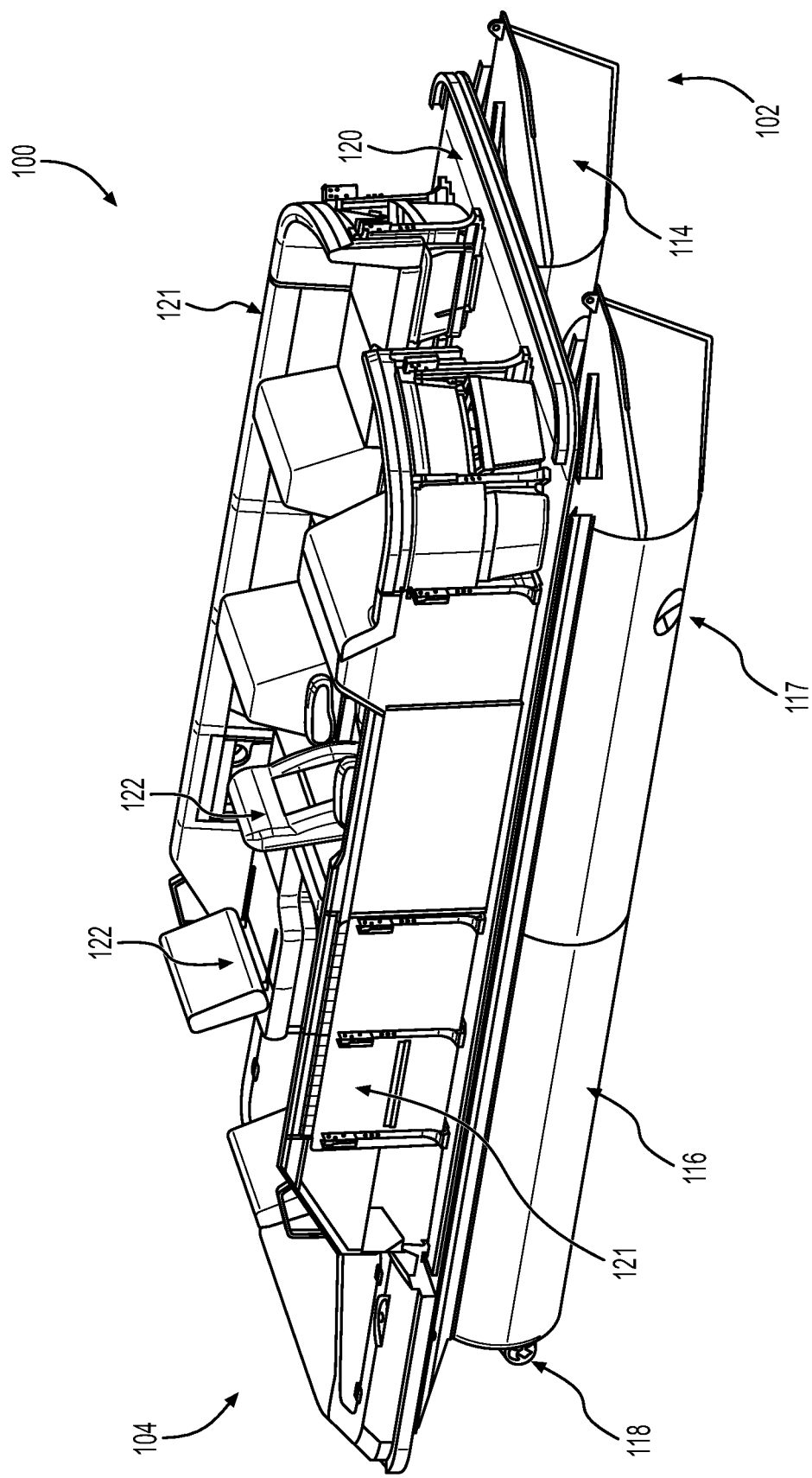
FIG. 1 is a front, right side perspective view of a watercraft according to a non-limiting embodiment of the present technology.
Figure 2:
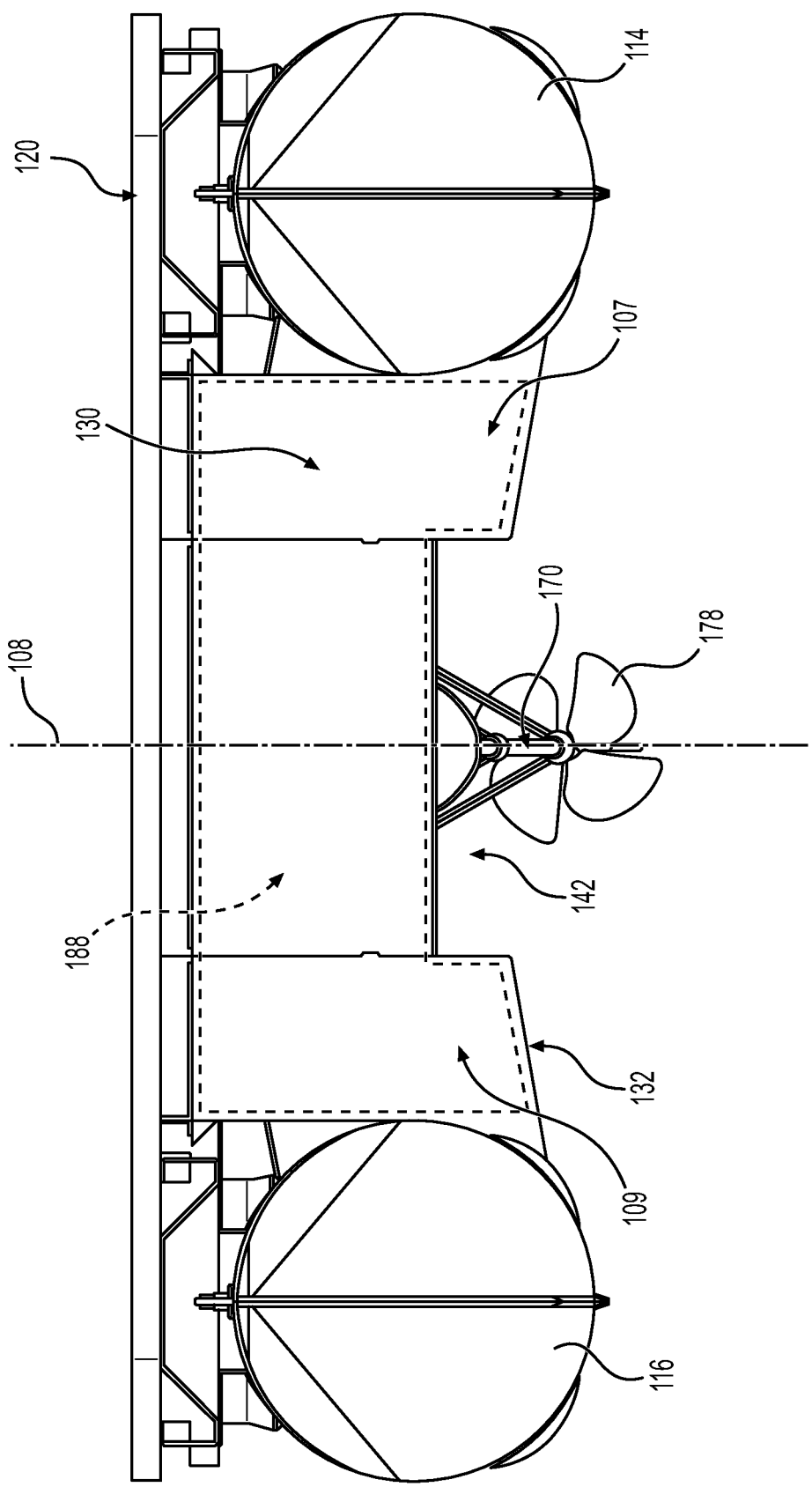
FIG. 2 is a front elevation view of a hull, pontoon tubes, and a deck of the watercraft of FIG. 1, with passenger components having been removed.
Figure 3:
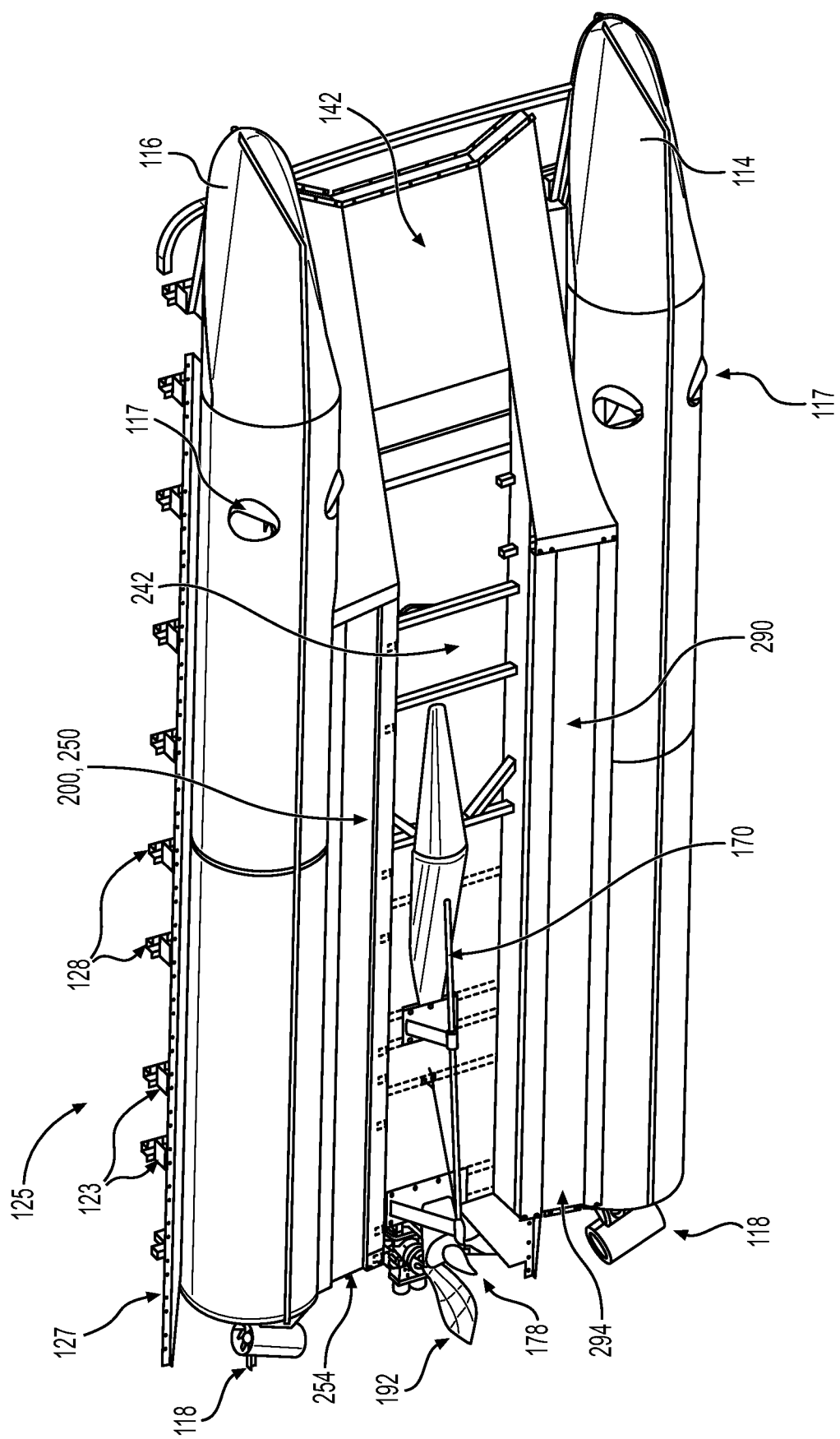
FIG. 3 is a bottom, right side perspective view of the hull and the pontoon tubes of FIG. 2.

A watercraft 100 in accordance with one embodiment of the present technology is shown in FIG. 1, with portions of the watercraft 100 being illustrated in FIGS. 2 and 3. The following description relates to one example of a watercraft, notably a pontoon boat 100 with an inboard electric propulsion system 150. Those of ordinary skill in the art will recognize that there are other known types of watercrafts incorporating different designs and that at least some aspects of the present technology would encompass these other watercrafts.

The watercraft 100 has a front end 102, also referred as a bow 102, and a rear end 104, also referred to as a stern 104. A longitudinal center axis 106 of the watercraft 100 is defined from the front end 102 to the rear end 104 (illustrated in FIG. 5). A longitudinal center plane 108 is also defined for the watercraft 100, illustrated in FIG. 2. The longitudinal center plane 108 is aligned with the center axis 106 from the front end 102 to the rear end 104 and extends vertically to transect the watercraft 100 into two lateral halves, left and right.

The watercraft 100 includes a pair of sealed pontoon tubes, also referred to as pontoons: a left tube 114 and a right tube 116. Each tube 114, 116 includes a rear-mounted thruster 118 and a forward thruster 117 disposed in a forward portion of the tubes 114, 116 for aiding in handling operation of the watercraft 100. In some embodiments, one or both of the thrusters 117, 118 could be omitted.

The watercraft 100 includes a deck 120 supported by the tubes 114, 116. The deck 120 is formed from a composite polymer panel covered by watercraft carpeting, although the particular materials forming the deck 120 could vary in different embodiments. For example, wood panels could be used to for the deck 120, as is common in conventional pontoon boats. The deck 120 has an upper surface for supporting occupants, as well as accessories and accommodations of the watercraft 100 (e.g., seating, command console, etc.). In this embodiment, the deck 120 receives thereon various railing structures 121 and seating structures 122, although the particular arrangement could vary from the illustrated embodiment.

With additional reference to FIG. 3, the present embodiment of the watercraft 100 includes a support structure 125 extending between the tubes 114, 116 for receiving the deck 120. The support structure 125 is formed from longitudinal rigid members 127 connected to the left tube 114 and the right tube 116 (one member 127 being illustrated), brackets 123 and lateral rigid members 128, commonly referred to as deck risers. Each lateral member 128 is connected by its end portions to right and left rigid members 127 by one of the brackets 123. It is contemplated that more or fewer rigid members 127, 128 could be utilized in different embodiments of the support structure 125. It is also contemplated that in some embodiments of the watercraft 100, elements of the support structure 125 could be omitted, such as the deck risers, or that the support structure 125 could be omitted in its entirety. For example, the deck 120 could be configured and arranged to connect directly to the tubes 114, 116.

The watercraft 100 also includes a hull 130 disposed below the deck 120 and between the left and right tubes 114, 116. The hull 130 is connected to a bottom side of the deck 120 near the front and rear ends 102, 104 of the watercraft 100 and to the pair of tubes 114, 116. It is contemplated that the hull 130 could be connected to the deck 120 and/or the tubes 114, 116 with rivets, bolts and/or welds, although other means of connection are possible. In some embodiments, it is also contemplated that the hull 130 could be connected directly to the support structure 125. It is also contemplated that the hull 130 could be connected to only the deck 120 or only the tubes 114, 116. It is further contemplated that in some embodiments, the tubes 114, 116 could be omitted and compensated for by the hull 130. In such embodiments, the hull 130 could be formed to occupy a volume equal to that of the tubes 114, 116 and the hull 130 of the illustrated embodiments.

Between the hull 130, the deck 120, and the tubes 114, 116 is defined a volume 188 of the watercraft 100 (shown schematically in FIG. 2) in which are received components of the inboard electric propulsion system 150, as will be described in further detail below. In at least some embodiments, edges between the hull 130, the deck 120, and the tubes 114, 116 are not sealed to reduce complexity of construction of the watercraft 100, although the edges may be sealed in some other embodiments.

As can be further seen in FIG. 3, the hull 130 has a lower, outer surface 132 arranged to contact water when the watercraft 100 is in use. As will be described in detail below, two heat exchangers 250, 290 of a cooling system 200 form portions of an outer surface of the watercraft 100, as the heat exchangers 250, 290 are disposed in the hull 130. The outer surface 132 extends between the tubes 114, 116 and defines a channel 142 in the hull 130. In some embodiments, the outer surface 132 could include outer portions of all or parts of the pontoons 114, 116. In embodiments where the pontoons 114, 116 are omitted, it is also contemplated that the outer surface 132 could extend over an entirety of a lower portion of the watercraft 100.

The channel 142 extends along the bottom of the watercraft 100 and is centered on the longitudinal center plane 108. It is contemplated, depending on the exact dimensions of the watercraft 100, that the channel 142 could be defined by more or less of the outer surface 132 in some embodiments. Briefly, the channel 142 aids in providing adequate water flow to an inboard motor-driven propeller 178, disposed slightly rearward of the channel 142 (described further below). The exact width of the channel 142 could therefore depend on various factors, including but not limited to: operational details of the propeller 178, size and weight of the watercraft 100, and other hydrodynamic factors. In some embodiments of the present technology, it is also contemplated that the channel 142 could be omitted.

The outer surface 132 extends laterally inward and slightly upward from each tube 114, 166 toward the channel 142. The exact form of the outer surface 132 used in any given embodiment of the watercraft 100 could depend on numerous details specific to the embodiment of the watercraft 100, including but not limited to: weight of the watercraft 100, operational details of the propeller 178, and other hydrodynamic factors. It is contemplated, for example, that another embodiment of a hull could have a differently shaped outer surface, include the form of the channel and the angles (in both lateral and longitudinal orientations) of inclined surfaces. While the cross-sectional shapes of the channel 142 illustrated herein is generally rectangular in form, it is also contemplated that the cross-sectional shape of the channel could vary in different embodiments.

While the hull 130 is described herein as a hull having a channel, it is contemplated that the illustrated embodiment could also be considered a watercraft 100 having a multi-hull 130. Considered in this terminology, the multi-hull 130 would then include a left hull 107 and a right hull 109 (identified thusly in FIG. 2), with the channel 142 defining the space between the hulls 107, 109. It is also contemplated that the present technology could be applied to a watercraft with buoyancy maintained only by the hull, i.e. where the pontoons are omitted.

Figure 4:
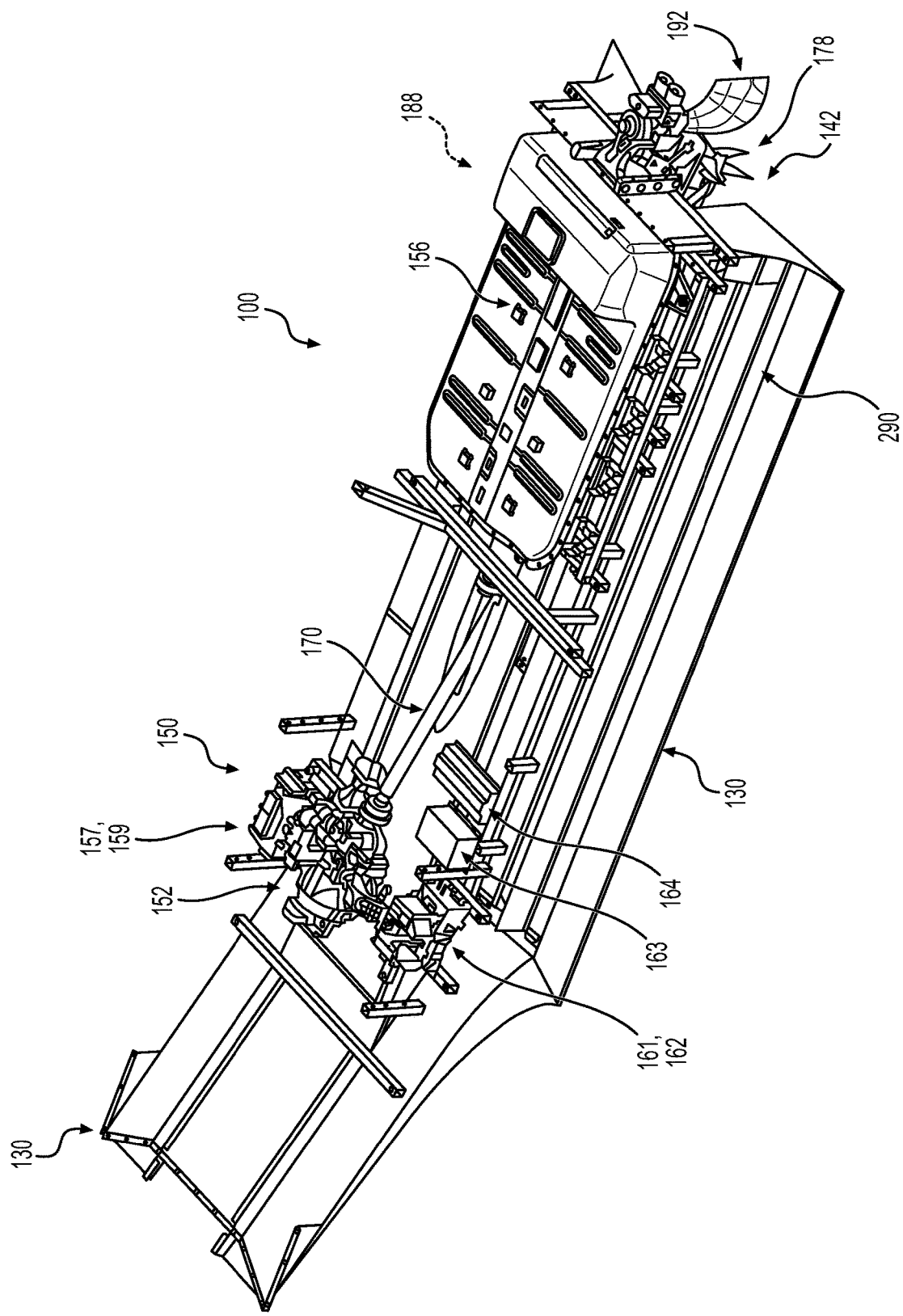
FIG. 4 is a top, rear, left side perspective view of a hull, an inboard propulsion system, and a rudder of the watercraft of FIG. 1.
Figure 5:
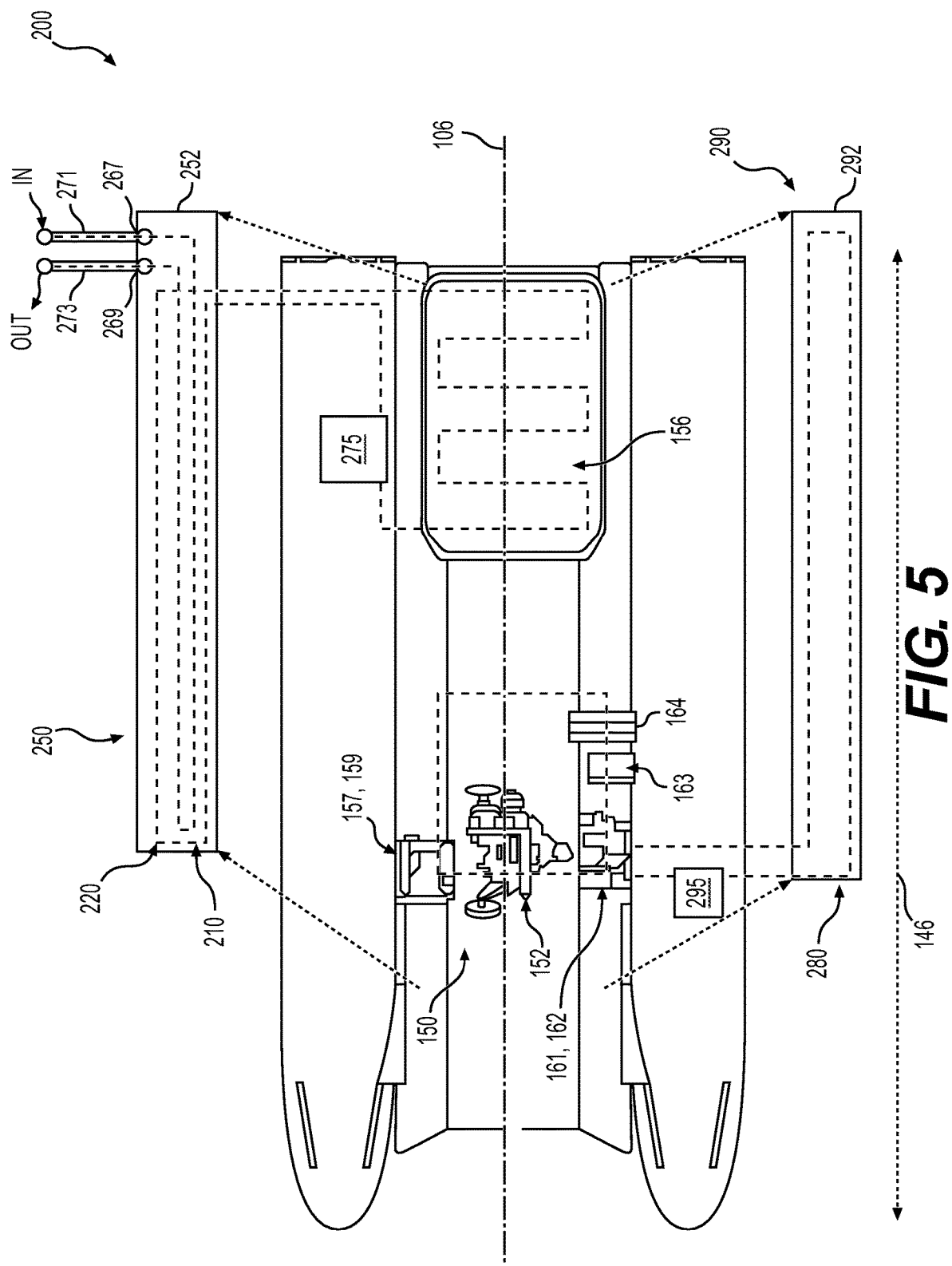
FIG. 5 is a schematic, top plan view of a cooling system and portions of the propulsion system of the watercraft of FIG. 1.
Figure 6:
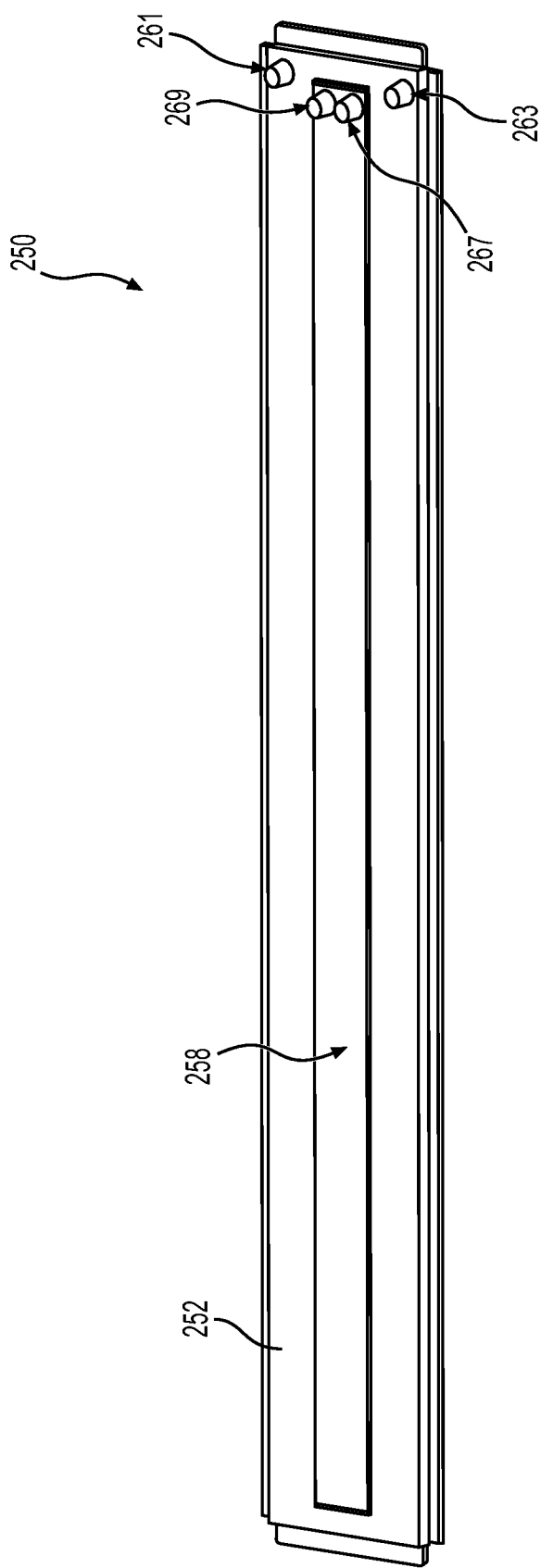
FIG. 6 is a top, left side perspective view of a heat exchanger of the cooling system of FIG. 5.

In FIGS. 4 and 5, the inboard electric propulsion system 150 propelling the watercraft 100 is illustrated. The propulsion system 150 is disposed below the deck 120, with portions of the system 150 being received in the volume 188 defined between the hull 130, the deck 120, and the tubes 114, 116.

The propulsion system 150 includes a plurality of electrical components disposed between the hull 130 and the deck 120. As is mentioned above, seams formed at boundaries between the hull 130, the deck, and/or the tubes 114, 116 are not necessarily sealed and are water-permeable. As such, the electrical components of the system 150 are waterproof to an Ingress Protection Code standard of IP67.

It is contemplated that different standards could be applied, depending on the particular embodiment or desired application.

The electrical components of the system 150 include an electric motor 152 disposed in a forward portion of the watercraft 100. The electric motor 152 is disposed above the outer surface 132 of the hull 130 and below the deck 120. An acceleration lever (not shown) is operatively connected to the electric motor 152 for controlling operation of the motor 152. The acceleration lever is located on a command console (not illustrated), also referred to as a helm, provided on the deck 120. It is contemplated that different input and control mechanisms could be used for controlling the motor 152 by an operator.

In order to power the motor 152, the electronic components of the system 150 also include a battery pack 156, referred to herein generally as the battery 156, disposed in a rear portion of the watercraft 100. Similarly to the motor 152, the battery 156 is disposed above the outer surface 132 of the hull 130 and below the deck 120. The exact arrangement of the battery 156 in the watercraft 100 could vary. The electric motor 152 is electrically connected to the battery 156 by a plurality of waterproof power supply cables (not illustrated) although the number and style of electrical connection between the motor 152 and the battery 156 could vary. In the illustrated embodiment, the battery 156 and the electric motor 152 are disposed vertically over the channel 142, although this could vary depending on the embodiment. When considering the hull 130 as the multi-hull 130, the receiving surface 189 extends above the channel 142 and between the left hull 107 and the right hull 109.

The propulsion system 150 further includes electronic management and conversion components communicatively connected to the motor 152, as can be seen in FIGS. 4 and 5. These components include a DC-DC converter 157 that provides current for the low voltage electronics and a charger unit 159 disposed to the right of the motor 152. The electronic components also include a regulator unit 161 that regulates power distribution, an inverter 162, a thruster system battery 163 for powering the thrusters 117, 118, and a boost converter 164 disposed to the left of the motor 152. The exact arrangement of the motor 152 and the electronic components 157, 159, 161, 162, 163, 164 could vary in different embodiments.

It is contemplated that the watercraft 100 could also include additional and/or alternative electronic or electrical components, for example, for controlling the propulsion system 150 and for managing operation of the watercraft 100. These components could include, but are not limited to, electronic cooling system, passenger accessory systems, navigation systems, watercraft control systems, and communication systems.

The propulsion system 150 includes a propulsion shaft 170 operatively connected to the electric motor 152 for driving the propeller 178. A front end 172 of the propulsion shaft 170 is connected and driven by the motor 152. From the front end 172 at the motor 152, the propulsion shaft 170 extends downward and rearward from the motor 152 toward the rear 104 of the watercraft 100 along the longitudinal center plane 108. The propulsion shaft 170 passes from inside the hull 130 outward into the channel 142, thereby connecting the motor 152 disposed inside the volume 188 to the propeller 178 arranged to be submerged when the watercraft 100 is in operation.

The propeller 178 is connected to and supported by the propulsion shaft 170. The propeller 178 is disposed generally rearward of the channel 142, although precise longitudinal placement of the propeller 178 could vary for different embodiments. The propeller 178 is a four blade, fixed-pitch propeller which rotates about a center of rotation 179, although the particular form of the propeller 178 could vary.

The watercraft 100 also includes a rudder 192 pivotally connected to the hull 130 behind the propeller 178. In some embodiments, the rudder 192 could be additionally or alternatively pivotally connected to a rear portion of the deck 120. A steering wheel (not shown) on a command console (not illustrated) on the deck 120 is operatively connected to the rudder 192. It is contemplated that the steering wheel could be replaced by a handlebar in some embodiments.

In the present embodiment, an overall longitudinal length 146 of the hull 130 is approximately 6 meters, illustrated in FIG. 5. The exact length 146 could vary in different embodiments, with the length 146 preferably being at least 4 meters and less than 10 meters.

With continued reference to FIG. 5, the watercraft 100 includes a cooling system 200 for cooling the inboard electric propulsion system 150. The cooling system 200 is configured to aid in cooling the battery 156 and the other electronic components of the propulsion system 150 while the watercraft 100 is in use on a body of water, as well as cool the battery 156 when charging when the watercraft 100 is out of water.

Broadly, the cooling system 200 includes two cooling paths: one cooling path 210 for transferring heat from the battery 156 to a heat exchanger 250 arranged to contact water when the watercraft 100 is in use, and a second cooling path 220 in thermal contact with the cooling path 210 for absorbing heat therefrom. In the illustrated embodiment, the cooling paths 210, 220 are in thermal contact via the heat exchanger 250 as will be detailed below. It is contemplated, however, that the cooling path 220 may not be in thermal contact with the heat exchanger 250 and may instead be arranged to absorb heat from the cooling path 210 at a separate point.

As such, the cooling system 200 is arranged such that, when the watercraft 100 is in use in a body of water, coolant flowing through the cooling path 210 absorbs heat from the battery 156, the heat exchanger 250 absorbs heat from coolant flowing through the cooling path 210, and the heat exchanger 250 is cooled by transferring heat to the body of water via an outer surface 254 of the heat exchanger 250. The cooling system 200 is further arranged such that, when the battery 156 is connected to a power source for charging and the watercraft 100 is not in the body of water, coolant flowing through the cooling path 210 absorbs heat from the battery 156, the heat exchanger 150 absorbs heat from coolant flowing through the cooling path 210, and coolant flowing through the cooling path 220 absorbs heat from the heat exchanger 250.

With reference to FIGS. 3 and 5 to 7, components of the cooling system 200 are illustrated in more detail. The cooling system 200 includes the heat exchanger 250, mentioned above, disposed in the hull 130. The heat exchanger 250 includes a heat exchanger body 252 formed from a heat conducting material. In the present embodiment, the heat exchanger body 252 is formed from metal, specifically aluminum, although the body 252 could be formed from different materials, including but not limited to: other metals or high thermal conductivity polymer composites. The body 252 is primarily composed of an extruded portion that forms longitudinal channels, discussed below, and end caps and hose connectors welded thereto. The heat exchanger body 252 includes an outer surface 254 arranged to contact water when the watercraft 100 is in use.

Figure 7:
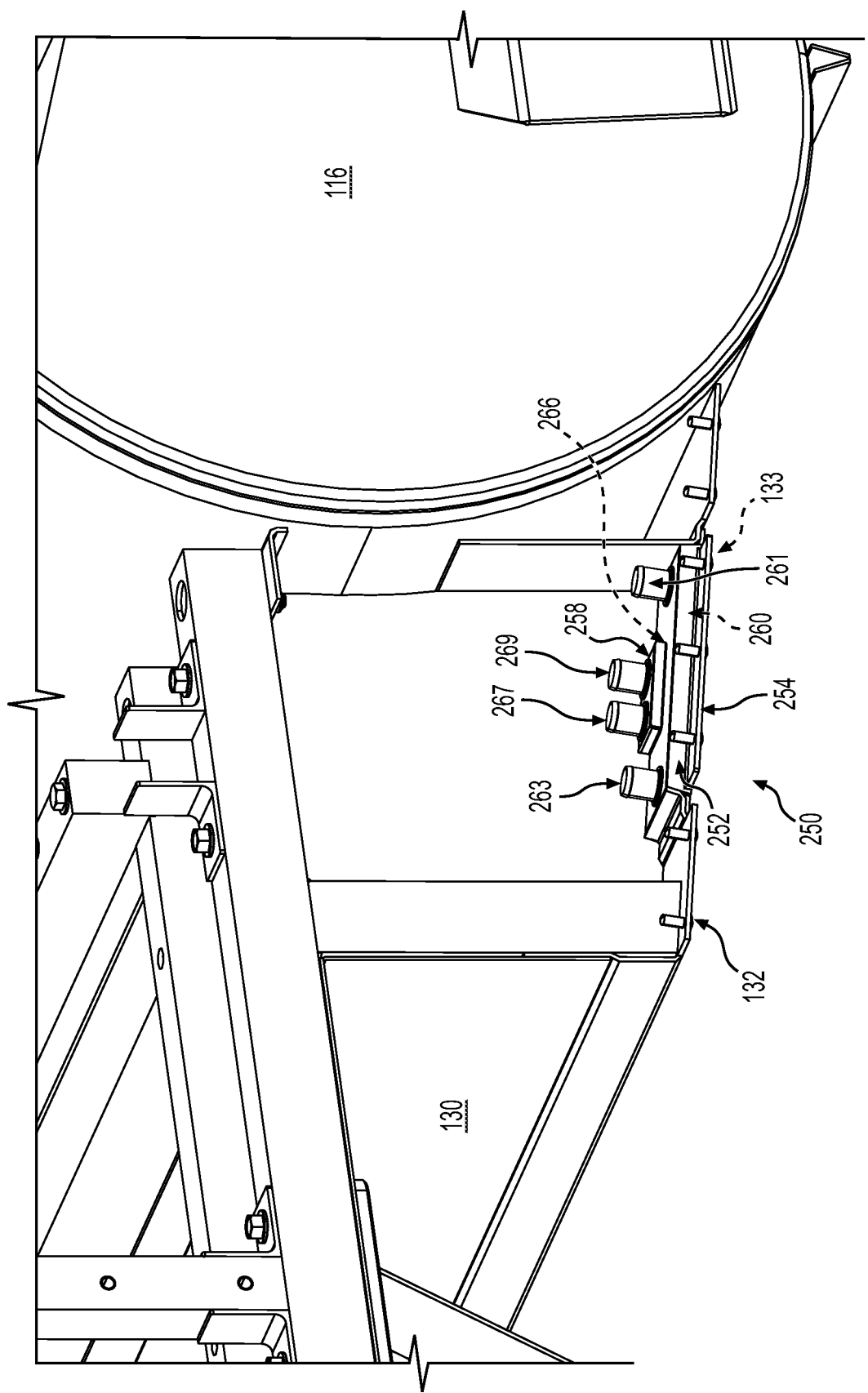
FIG. 7 is a partial, rear, left side perspective view of portions of the watercraft of FIG. 1.
Figure 8:
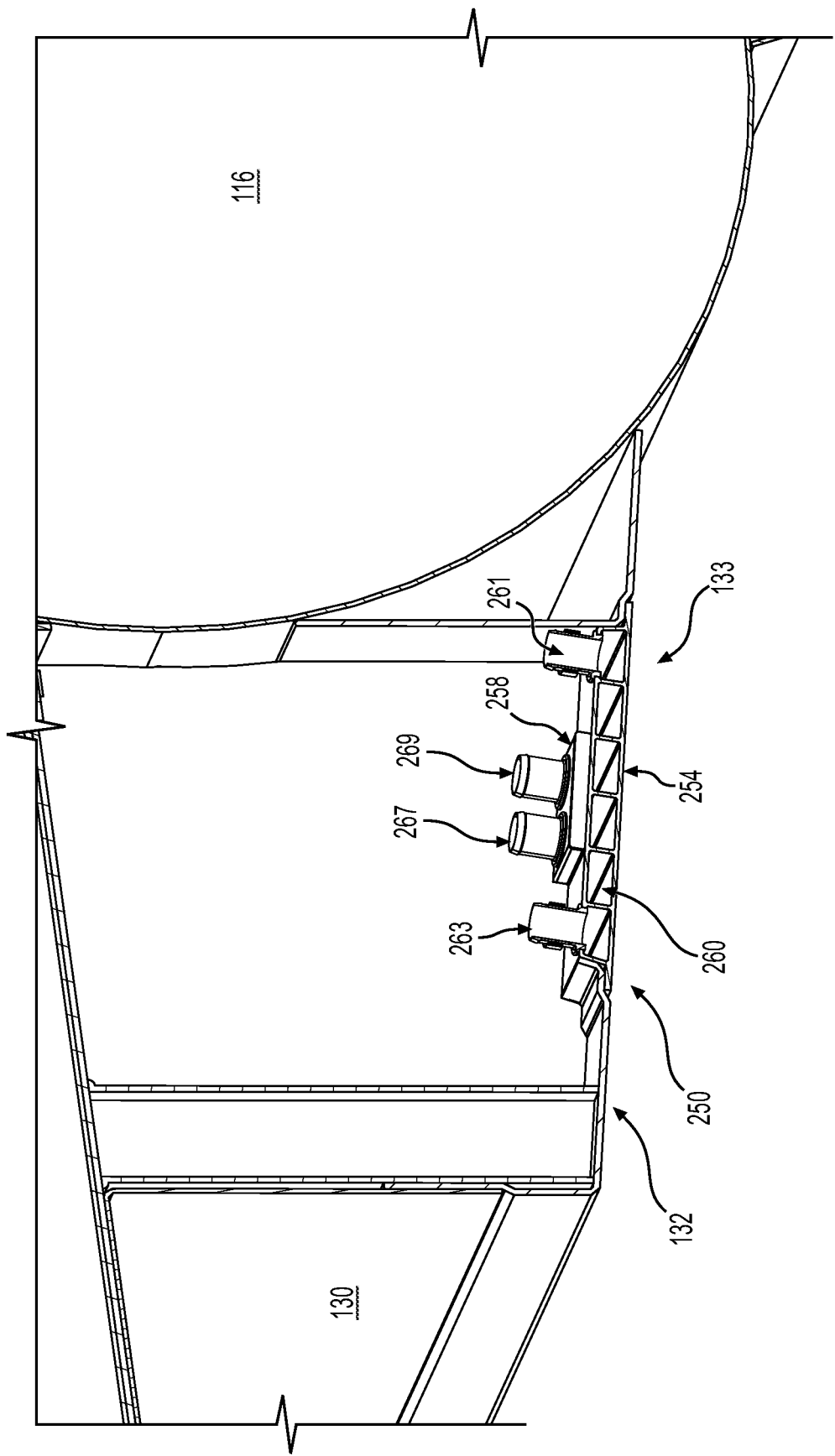
FIG. 8 is a cross-sectional view of portions of the watercraft illustrated in FIG. 7.

As can be seen in FIGS. 7 and 8, the hull 130 defines an aperture 133 therein for receiving the heat exchanger 250. The heat exchanger 250 is disposed in the aperture 133, such that the outer surface 254 of the heat exchanger 250 forms a portion of an outer surface of the watercraft 100. The outer surface 254 of the heat exchanger 250 is thus arranged to contact water when the watercraft 100 is in use. In the illustrated embodiment, the aperture 133 is defined in a portion of the hull 130 on a right side of the center plane 108, but in some embodiments the heat exchanger 250 could be received on a left side of the center plane 108 or in a center portion of the hull 130.

The heat exchanger body 252 includes two channels defined therein for receiving coolant therein. The heat exchanger body 252 defines a first channel 260 therein, shown in cross-section in FIGS. 8 and 9. The channel 260 forms a portion of the cooling path 210, described in more detail below.

The channel 260 is positioned adjacent to and in thermal contact with the outer surface 254 for conducting heat therebetween, specifically for conducting heat from coolant flowing through the channel 260 to water contacting the outer surface 254 when in use (described in further detail below). The channel 260 is formed from six connected rectangular hollow passages extending through the heat exchanger body 252, the passages extending longitudinally along the length of the heat exchanger 250, that together form a boustrophedonic path. Depending on the embodiment, the channel 260 could be formed from more or fewer hollow passages through the heat exchanger body 252. It is also contemplated that different channel shapes are contemplated.

The heat exchanger 250 includes a channel inlet 261 connected to the heat exchanger body 252 and fluidly connected to the channel 260 for coolant to flow into the channel 260. At an opposite end of the channel 260, there is a channel outlet 263 connected to the heat exchanger body 252 and fluidly connected to the channel 260. The inlet 261 and the outlet 263 are connected to conduits (not illustrated) for receiving coolant into and delivering coolant out of the heat exchanger 250. In different embodiments, placement of the inlet 261 and the outlet 263 could be reversed.

Figure 10:
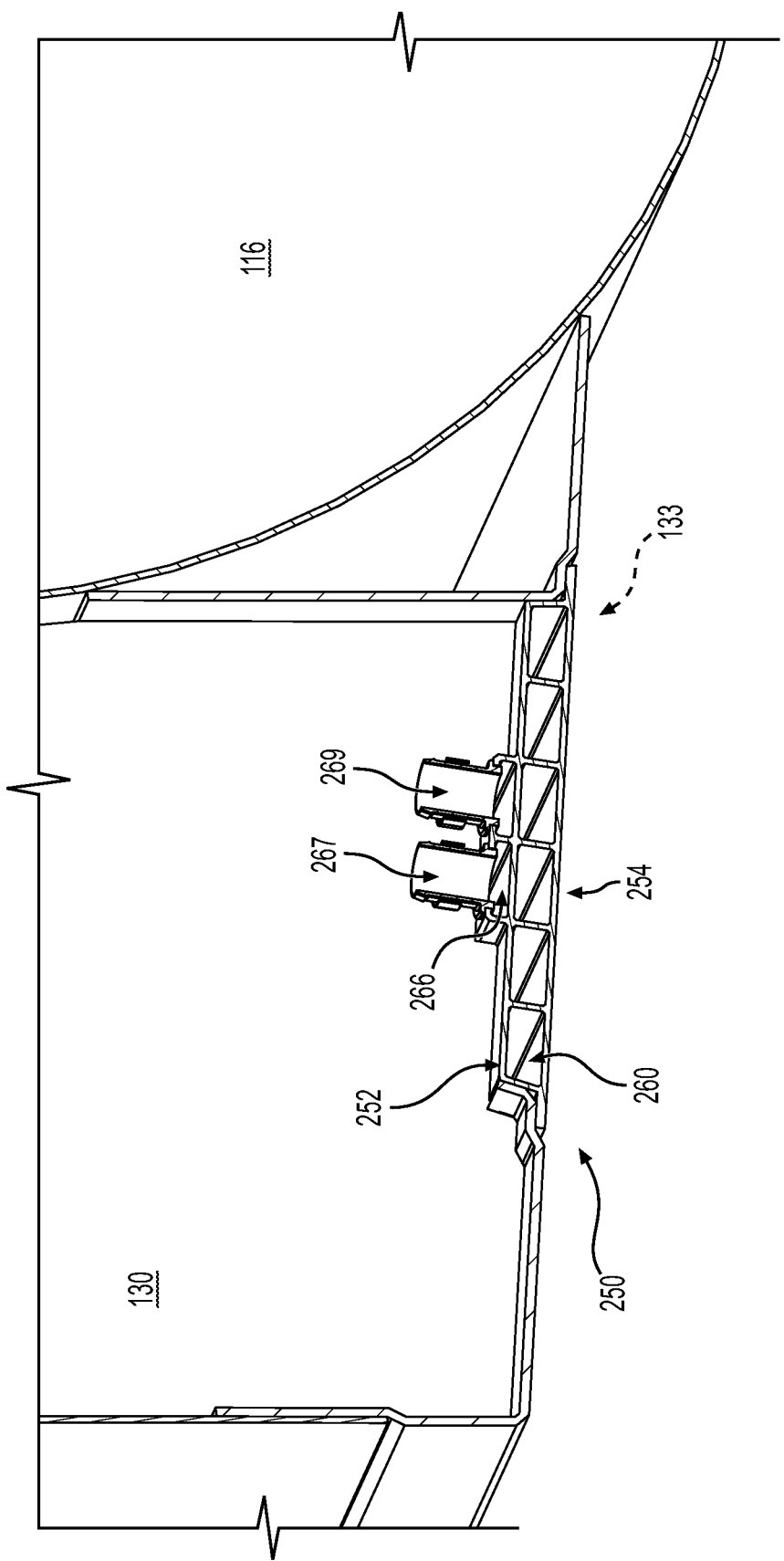
FIG. 10 is another cross-sectional view of portions of the watercraft illustrated in FIG. 7.
Figure 11:
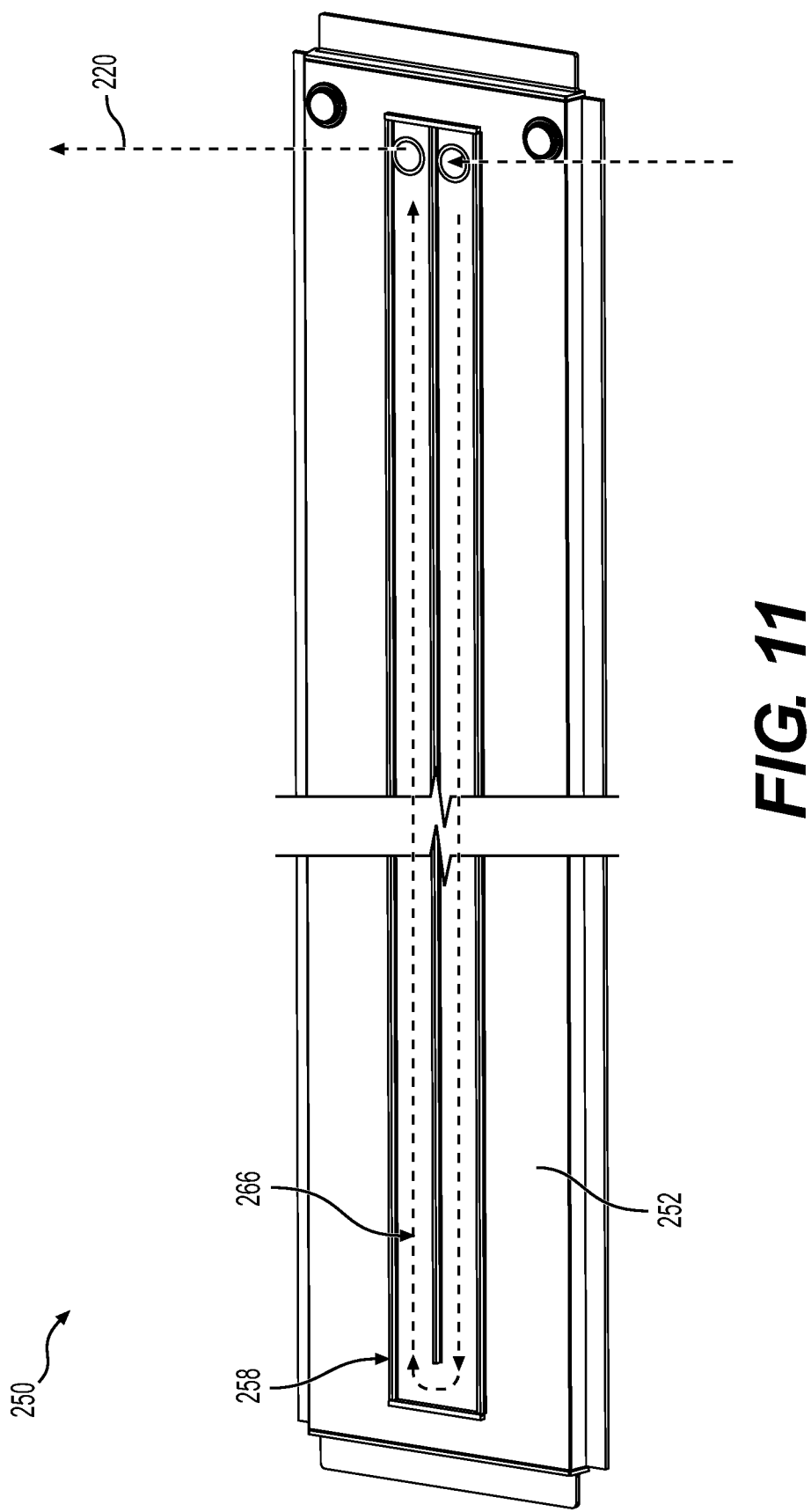
FIG. 11 is a perspective view of another cross-section of the heat exchanger of FIG. 6, taken along another plane parallel to the outer surface of the heat exchanger and illustrating a flow path.

The heat exchanger 250 also includes a second channel 266 defined in the heat exchanger body 252, illustrated in cross-section in FIGS. 10 and 11. The channel 266 forms a portion of the cooling path 220, described in more detail below.

The channel 266 is formed in a raised, inner portion 258 extending longitudinally along a center of the heat exchanger body 252, although the shape of the heat exchanger body 252 and/or the raised portion 258 could vary in different embodiments. The channel 266 is disposed over the channel 260 such that the channels 260, 266 are in thermal contact for conducting heat therebetween, with the channel 260 being defined parallel to and between the channel 266 and the outer surface 254. The channel 266 extends generally parallel to the outer surface 254. The channel 266 is formed from two connected rectangular hollow passages extending through the heat exchanger body 252, the passages extending longitudinally along the length of the heat exchanger 250. In some embodiments, the channel 266 could be formed from more passages and/or could cover a larger portion of the heat exchanger 250. It is also contemplated that different channel shapes are contemplated.

The heat exchanger 250 further includes a channel inlet 267 connected to the heat exchanger body 252 and fluidly connected to the channel 266 for coolant to flow into the channel 266. At an opposite end of the channel 266, but adjacent to the inlet 267, there is a channel outlet 269 connected to the heat exchanger body 252 and fluidly connected to the channel 266. The inlet 267 and the outlet 269 are configured for selectively connecting to one or more conduits for providing coolant to the channel 266 or receiving coolant therefrom. The watercraft 100 also includes an inlet conduit 271, fluidly connected to the inlet 267, for receiving coolant from an external coolant source (described further below) from outside the watercraft 100 and delivering the coolant to the channel inlet 267. The watercraft 100 further includes an outlet conduit 273, fluidly connected to the outlet 269, for receiving coolant from the channel 266 via the channel outlet 269 and delivering the coolant to an exterior of outside the watercraft 100. Both the inlet conduit 271 and the outlet conduit 273 are shown schematically in FIG. 5. An input end of the inlet conduit 271 is configured for selectively connecting an external hose thereto (not illustrated). Similarly, an outlet end of the outlet conduit 273 is configured for selectively connecting another external hose thereto to direct output of the coolant in a desired direction (not illustrated), although this may not be the case in all embodiments.

Figure 9:
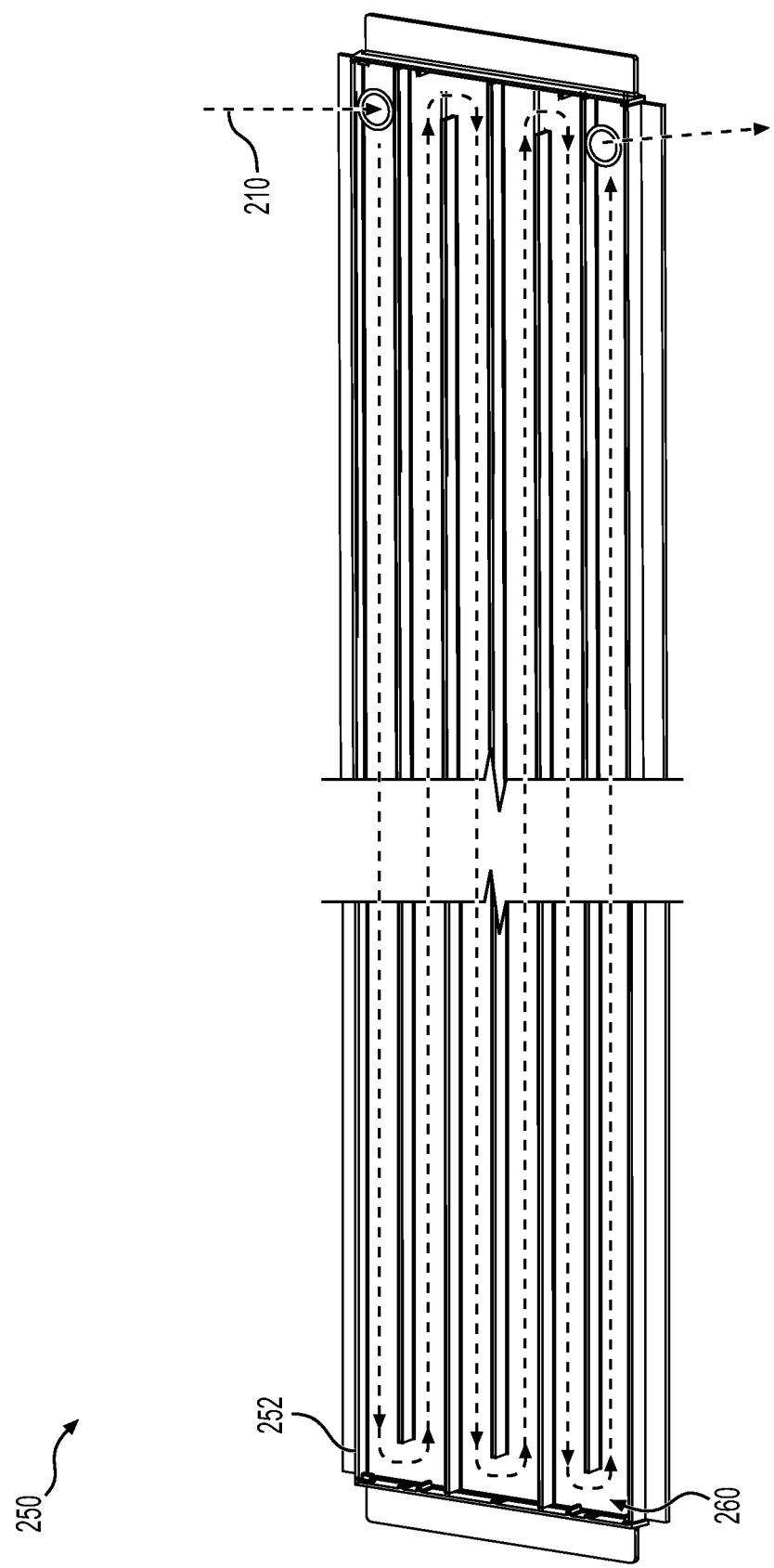
FIG. 9 is a perspective view of a cross-section of the heat exchanger of FIG. 6, taken along a plane parallel to an outer surface of the heat exchanger.
Figure 12:
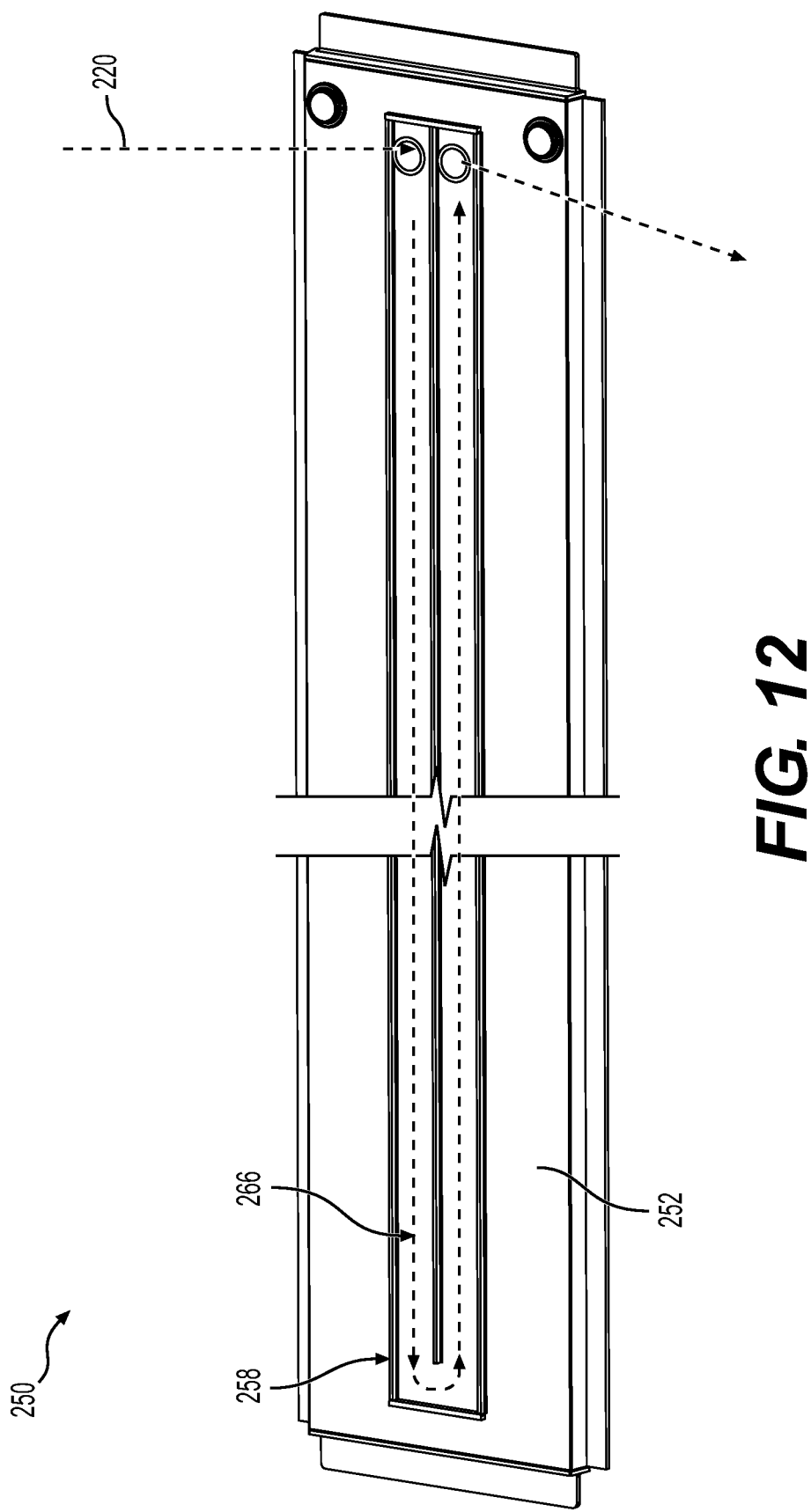
FIG. 12 is the perspective view of the cross-section of FIG. 11, illustrating another flow path.

As can be seen by comparing FIGS. 9 and 11, the heat exchanger 250 is arranged as a countercurrent flow heat exchanger 250. When the closed cooling path 210 and the open cooling path 220 are in use, coolant flowing through the closed path channel 210 flows antiparallel to coolant flowing through open path channel 220. In some embodiments, the inlet 267 and the outlet 269 could be reversed, as is illustrated in FIG. 12. In such a case, the heat exchanger is arranged as a cocurrent flow heat exchanger 250, where when the closed cooling path 210 and the open cooling path 220 are in use, coolant flowing through the closed path channel 210 flows parallel to coolant flowing through open path channel 220. Depending on the specific pattern formed by the channels 260, 266, various other arrangements of the heat exchanger 250 are contemplated.

The cooling path 210, in the present embodiment, is a closed cooling path 210 disposed between the hull 130 and the deck 120. It is contemplated that portions of the path 210 could extend outside of the hull 130 and/or the deck 120 in some embodiments. As is mentioned above, the cooling path 210 is in thermal contact with the battery 156 and the heat exchanger 250. Specifically, the channel 260 of the heat exchanger 250 defines a portion of the cooling path 210. Remaining portions of the cooling path 210 are defined by various tubes and conduits (not illustrated), but the specific structures will vary depending on the embodiment. Illustrated schematically in FIG. 5, the cooling path 210 extends along a lower surface of the battery 156 in a thermal contact arrangement to absorb heat therefrom. In some embodiments, the cooling path 210 could include a heat exchanger connected to the battery 156, although the particular form of thermal contact between the battery 156 and the cooling path 210 could vary.

The cooling system 200 also includes a pump 275 (shown schematically in FIG. 5) fluidly connected to the cooling path 210 for pumping coolant through the cooling path 210. The closed coolant path 210 is supplied with a refrigerant fluid coolant to efficiently absorb and release heat, depending on the local heat gradient at different points in the cooling path 210.

The cooling path 220, in the present embodiment, is an open cooling path 220 with portions disposed between the hull 130 and the deck 120. The cooling path 220 is configured for connecting to an external coolant source outside of the hull 13 and/or the deck 120, specifically when the battery 156 is connected to a power source for charging. As is mentioned above, the cooling path 220 is in thermal contact with the cooling path 210 and, in the illustrated embodiment, the heat exchanger 250. Specifically, the channel 266 of the heat exchanger 250, along with the corresponding inlet 267 and outlet 269, define the cooling path 220. It is contemplated that the cooling path 220 could be defined by additional conduits or piping, for instance by additional piping for connecting the inlet 267 to an external coolant source.

When the watercraft 100 is out of water and the battery 156 is connected to a power source for charging, coolant needs to be supplied to the open cooling path 220. It is contemplated that the coolant will take the form of water supplied from an external water source. For instance, water for flowing through the open cooling path 220 could come from a water source, such as a conventional garden hose connected to a faucet or spigot, when the watercraft 100 is parked on a boat trailer. In some cases, for example when stored in a marina, on a boat lift or in dry dock, the coolant could be supplied in the form of water pumped to the inlet 267 from a nearby body of water. The hose, either the garden hose or conduit from a pump, would be connected to the inlet 267 when in use, although in some embodiments an additional conduit could be used to provide a connection point for the hose.

While there is no pump supplied for the open cooling path 220 in the illustrated embodiment, it is contemplated that a pump powered by the battery 156, or another power source, could be included in the watercraft 100 in some cases. It is also contemplated that an external pump could be fluidly connected to the open cooling path 220. In at least some embodiments, an additional conduit could also be connected to the outlet 269 for directing coolant exiting the open cooling path 220 in a desired direction, for example for collection.

While the second cooling path 220 is illustrated and described as an open cooling path, with an input and output open to an exterior of the watercraft 100, it is contemplated that at least some aspects of the present technology could be implemented with the second cooling path 220 in the form of a closed cooling path. For example, the open cooling path 220 could be replaced with a secondary cooling path passing through the channel 266 as well as an additional heat exchanger. When in use, coolant flowing through the secondary cooling path would absorb heat from the heat exchanger 250, as with the path 220, and then the additional heat exchanger would absorb heat from the coolant flowing therethrough along the secondary cooling path. In some such embodiments, an additional pump for pumping coolant through the secondary cooling path could be included and configured to operate when the battery 156 is charging.

In the present embodiment, the cooling system 200 also includes a component cooling path 280 for cooling electronic components 152, 157, 159, 161, 162, 163, 164 of the propulsion system 150 (other than the battery 156), illustrated schematically in FIG. 5. The cooling system 200 includes a heat exchanger 290 disposed in the hull 130 to a left side of the channel 142. It is contemplated that the heat exchanger 290 could be disposed in other parts of the hull 1300, for instance in a side portion of the hull 130. As with the heat exchanger 250, the heat exchanger 290 includes a heat exchanger body 292. A channel (not shown) defined in the body 292 defines a portion of the cooling path 280. In some embodiments, the heat exchanger 290 could be structurally identical to the heat exchanger 250, although in most cases use of an open cooling path would not be necessary. The cooling system 200 also includes a pump 295 (shown schematically) fluidly connected to the cooling path 280 for pumping coolant through the cooling path 280. As can be seen from FIG. 3, the heat exchanger 290 includes an outer surface 294 arranged for contacting water when the watercraft 100 is in use. In at least some embodiments, it is contemplated that the component cooling path 280 could be omitted. It is also contemplated that one or more of the electronic components 152, 157, 159, 161, 162, 163, 164 could be arranged in thermal contact with one of the cooling paths 210, 220. In some embodiments, it is contemplated that the motor 152 and/or the charger unit 159 could be in thermal contact with the cooling path 210, in order to be cooled when the battery 156 is charging.

When the cooling path 280 is in use, coolant is pumped from the heat exchanger 290 by the pump 295, coolant then passes into thermal contact with the motor 152, then the DC-DC converter 157 and the charger unit 159, then the converter 164, then the thruster system battery 163, and then the regulator unit 161 and the inverter 162. Coolant then flows through the heat exchanger 290 to transfer heat from the components, absorbed by the coolant, to the heat exchanger 290.

Figure 13:
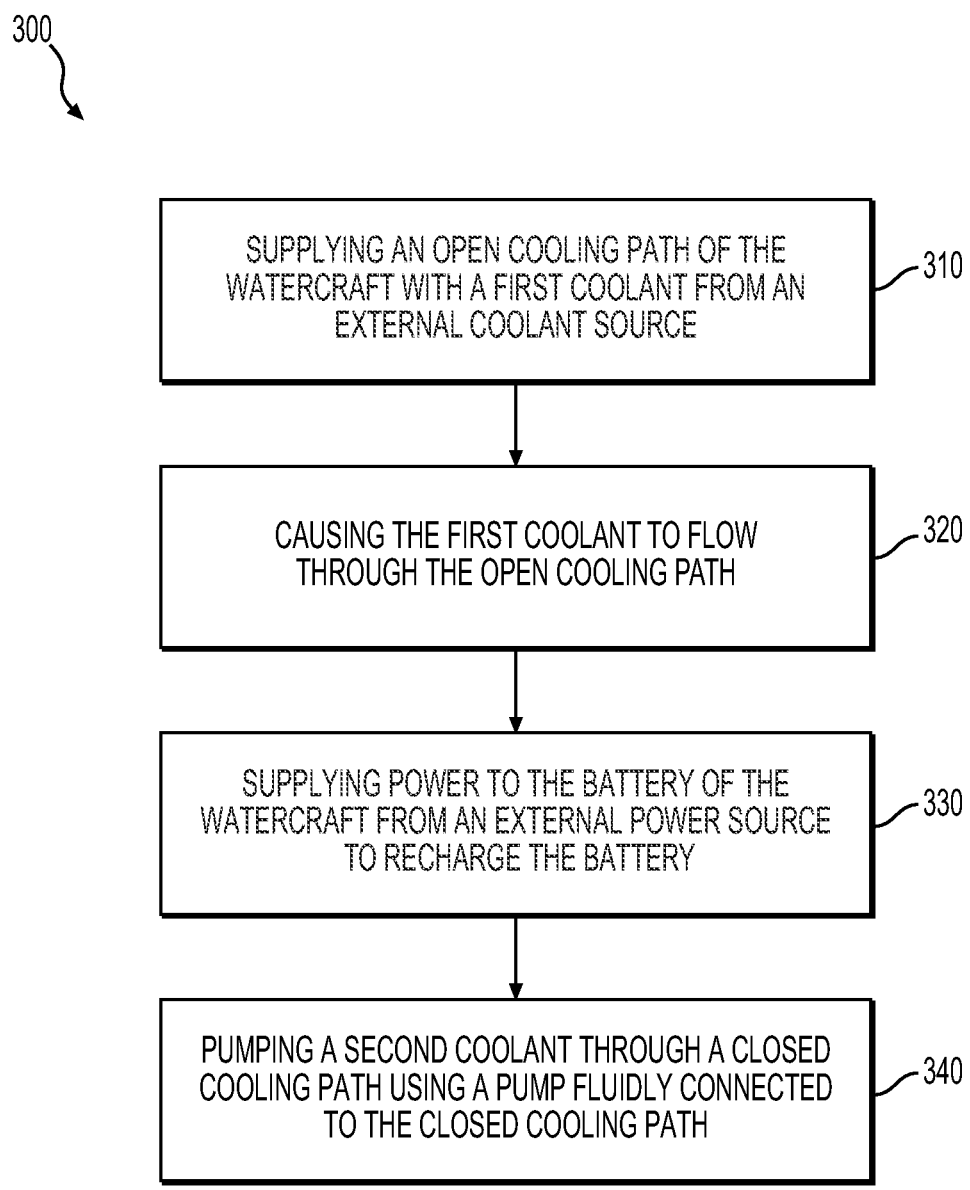
FIG. 13 is a schematic flowchart illustrating a method for charging a battery of the watercraft of FIG. 1.

In reference to FIG. 13, a method 300 for charging the battery 156 according to non-limiting embodiments of the present technology is illustrated.

The method 300 begins, at step 310, with supplying the open cooling path 220 of the watercraft 100 with a coolant from an external coolant source. The method 300 continues, at step 320, with causing the coolant to flow through the open cooling path 220.

According to at least some embodiments, the coolant from the external source is water supplied to the cooling path 220 from a residential water hose. The hose is connected to the inlet conduit 271 for providing the water to the channel 266, and when flow to the hose is opened, water is supplied to and caused to flow through the open cooling path 220.

The method 300 continues, at step 330, with supplying power to the battery 156 from an external power source to recharge the battery. The watercraft 100 includes a charging port (not shown) for connection to the external source, such as a residential or commercial electrical outlet, or a charging station. In some embodiments, power could be supplied to the battery 156 before activating the open cooling path 220.

The method 300 terminates, at step 340, with pumping coolant through the closed cooling path 210 using the pump 275 fluidly connected to the closed cooling path 210. Coolant flows through the closed cooling path 210 and the heat exchanger 250 when the pump 275 is activated. In some embodiments, it is contemplated that the pump 275 could activate automatically when the battery 156 begins charging. In some embodiments, the pump 275 could be activated by a user.

In some embodiments, the method 300 further includes causing the coolant to stop flowing through the open cooling path 220 when the battery 156 is no longer supplied with power for charging. In at least some embodiments, the inlet 167 includes a valve (not shown) for stopping coolant flow through the cooling path 220. It is also contemplated that the method 300 could further include causing the pump 275 to stop pumping coolant through the closed cooling path 210 when the battery 156 is no longer supplied with power for charging.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A watercraft comprising:
a hull defining an aperture;
a deck disposed above the hull;
an electric propulsion system supported by at least one of the hull and the deck, the electric propulsion system including:
a battery, and
an electric motor electrically connected the battery;
a cooling system including:
a heat exchanger disposed in the hull, the heat exchanger including an outer surface arranged to conduct heat out of the hull, the heat exchanger being disposed in the aperture,
the outer surface of the heat exchanger forming a portion of an outer surface of the watercraft, the outer surface of the heat exchanger being arranged to contact water when the watercraft is in use;
a closed cooling path disposed at least partially between the hull and the deck, the closed cooling path being in thermal contact with the heat exchanger, the closed cooling path being in thermal contact with the battery; and
an open cooling path disposed at least partially between the hull and the deck, the open cooling path being in thermal contact with a portion of the closed cooling path.

2. The watercraft of claim 1, wherein the cooling system is arranged such that, when the battery, the closed cooling path, and the open cooling path are in use:
coolant flowing through the closed cooling path absorbs heat from the battery;
the heat exchanger absorbs heat from coolant flowing through the closed cooling path; and
coolant flowing through the open cooling path absorbs heat from the closed cooling path.

3. The watercraft of claim 1, wherein a portion of the closed cooling path is defined by the heat exchanger.

4. The watercraft of claim 3, wherein a portion of the open cooling path is defined by the heat exchanger, the closed cooling path and the open cooling path being in thermal contact via the heat exchanger.

5. The watercraft of claim 3, wherein the heat exchanger comprises:
a heat exchanger body formed from heat conductive material, the heat exchanger body including the outer surface; and
a closed path channel defined by the heat exchanger body, the closed path channel forming the portion of the closed cooling path.

6. The watercraft of claim 5, wherein the heat exchanger further comprises an open path channel defined by the heat exchanger body, the open path channel forming part of the open cooling path.

7. The watercraft of claim 6, wherein:
the open path channel is defined in an inner portion of the heat exchanger;
the open path channel extends through the heat exchanger body generally parallel to the outer surface;
the closed path channel is defined between the open path channel and the outer surface; and
the closed path channel extends through the heat exchanger body generally parallel to the open path channel and the outer surface.

8. The watercraft of claim 6, wherein the cooling system is arranged such that, when the battery, the closed cooling path, and the open cooling path are in use:
coolant flowing through the closed cooling path absorbs heat from the battery;
the heat exchanger absorbs heat from coolant flowing through the closed path channel; and
coolant flowing through the open path channel absorbs heat from the heat exchanger.

9. The watercraft of claim 6, wherein the heat exchanger further comprises:
an open path channel inlet connected to the heat exchanger body, the open path channel inlet being fluidly connected to the open path channel,
the open path channel inlet being configured for selectively connecting to a conduit for providing coolant to the open cooling path; and
an open path channel outlet connected to the heat exchanger body, the open path channel outlet being fluidly connected to the open path channel.

10. The watercraft of claim 1, wherein:
the heat exchanger is a first heat exchanger; and
further comprising:
at least one electrical component operatively connected to the battery,
a second heat exchanger disposed in the hull, and
a component cooling path in thermal contact with the at least one electrical component and the second heat exchanger.

11. The watercraft of claim 1, further comprising a pair of pontoon tubes connected to at least one of the hull and the deck.

12. The watercraft of claim 1, wherein the cooling system is arranged such that: when the watercraft is in use in a body of water:
coolant flowing through the closed cooling path absorbs heat from the battery,
the heat exchanger absorbs heat from coolant flowing through the closed cooling path, and
the heat exchanger is cooled by transferring heat to the body of water via the outer surface of the heat exchanger; and
when the battery is connected to a power source for charging and the watercraft is not in the body of water:
the open cooling path is connected to an exterior coolant source,
coolant flowing through the closed cooling path absorbs heat from the battery, and
coolant flowing through the open cooling path absorbs heat from coolant flowing through the closed cooling path.

13. A watercraft comprising:
a hull;
a deck disposed above the hull;
an electric propulsion system supported by at least one of the hull and the deck, the electric propulsion system including:
a battery, and
an electric motor electrically connected the battery;
a cooling system including:
a heat exchanger disposed in the hull, the heat exchanger including:
a heat exchanger body including an outer surface arranged to contact water when the watercraft is in use, a first channel defined in the heat exchanger body, the first channel being in thermal contact with the outer surface for conducting heat therebetween, and a second channel defined in the heat exchanger body, the second channel being in thermal contact with the first channel for conducting heat therebetween;

a first cooling path disposed at least partially between the hull and the deck, the first cooling path being in thermal contact with the battery, a portion of the first cooling path being defined by the first channel; and a second cooling path disposed at least partially between the hull and the deck, a portion of the second cooling path being defined by the second channel.

14. The watercraft of claim 13, wherein the cooling system is arranged such that, when the battery, the first cooling path, and the second cooling path are in use:

coolant flowing through the first cooling path absorbs heat from the battery;

the heat exchanger absorbs heat from coolant flowing through the first cooling path; and coolant flowing through the second cooling path absorbs heat from the heat exchanger.

15. The watercraft of claim 13, wherein:

the second channel is defined in an inner portion of the heat exchanger;

the second channel extends through the heat exchanger body generally parallel to the outer surface;

the first channel is defined between the second channel and the outer surface; and the first channel extends through the heat exchanger body generally parallel to the second channel and the outer surface.

16. The watercraft of claim 13, wherein:

the first cooling path is a closed cooling path; and the second cooling path is an open cooling path.

17. The watercraft of claim 16, wherein the heat exchanger further comprises:

an open path channel inlet connected to the heat exchanger body, the open path channel inlet being fluidly connected to the second channel, the open path channel inlet being configured for selectively connecting to a conduit for providing coolant to the open cooling path; and an open path channel outlet connected to the heat exchanger body, the open path channel outlet being fluidly connected to the open path channel.

18. The watercraft of claim 13, wherein the cooling system is arranged such that: when the watercraft is in use in a body of water:

coolant flowing through the first cooling path absorbs heat from the battery, the heat exchanger absorbs heat from coolant flowing through the first cooling path, and the heat exchanger is cooled by transferring heat to the body of water via the outer surface of the heat exchanger; and when the battery is connected to a power source for charging and the watercraft is not in the body of water:

coolant flowing through the first cooling path absorbs heat from the battery, the heat exchanger absorbs heat from coolant flowing through the first cooling path, and coolant flowing through the second cooling path absorbs heat from the heat exchanger.

19. The watercraft of claim 18, wherein the second cooling path is configured to be connected to an external coolant source when the battery is connected to a power source for charging.

20. A method for charging a battery of a watercraft, the method comprising:

connecting the battery to a power source, the watercraft not being in a body of water;

supplying an open cooling path of the watercraft with a first coolant from an external coolant source;

causing the first coolant to flow through the open cooling path;

supplying power to the battery of the watercraft from an external power source to recharge the battery; and pumping a second coolant through a closed cooling path using a pump fluidly connected to the closed cooling path, the closed cooling path being in thermal contact with the battery and the open cooling path, the closed cooling path absorbing heat from the battery, the open cooling path absorbing heat from the closed cooling path.

* * * * *

UNITED STATES PATENT AND TRADEMARK OFFICE
CERTIFICATE OF CORRECTION

| | | |
|---|---|---|
| PATENT NO. | : 12,427,892 B1 | Page 1 of 1 |
| APPLICATION NO. | : 17/827926 | |
| DATED | : September 30, 2025 | |
| INVENTOR(S) | : George Broughton, James Macier and Anthony Lavigna | |

It is certified that error appears in the above-identified patent and that said Letters Patent is hereby corrected as shown below:

On the Title Page

In the Item (56) References Cited - U.S. PATENT DOCUMENTS section; "3,753,159 A 8/1973 Burwen et al." should read --8,753,159 B1 6/2014 Brouillette et al.--

Signed and Sealed this
Eighteenth Day of November, 2025

John A. Squires
*Director of the United States Patent and Trademark Office*